Patented May 19, 1953

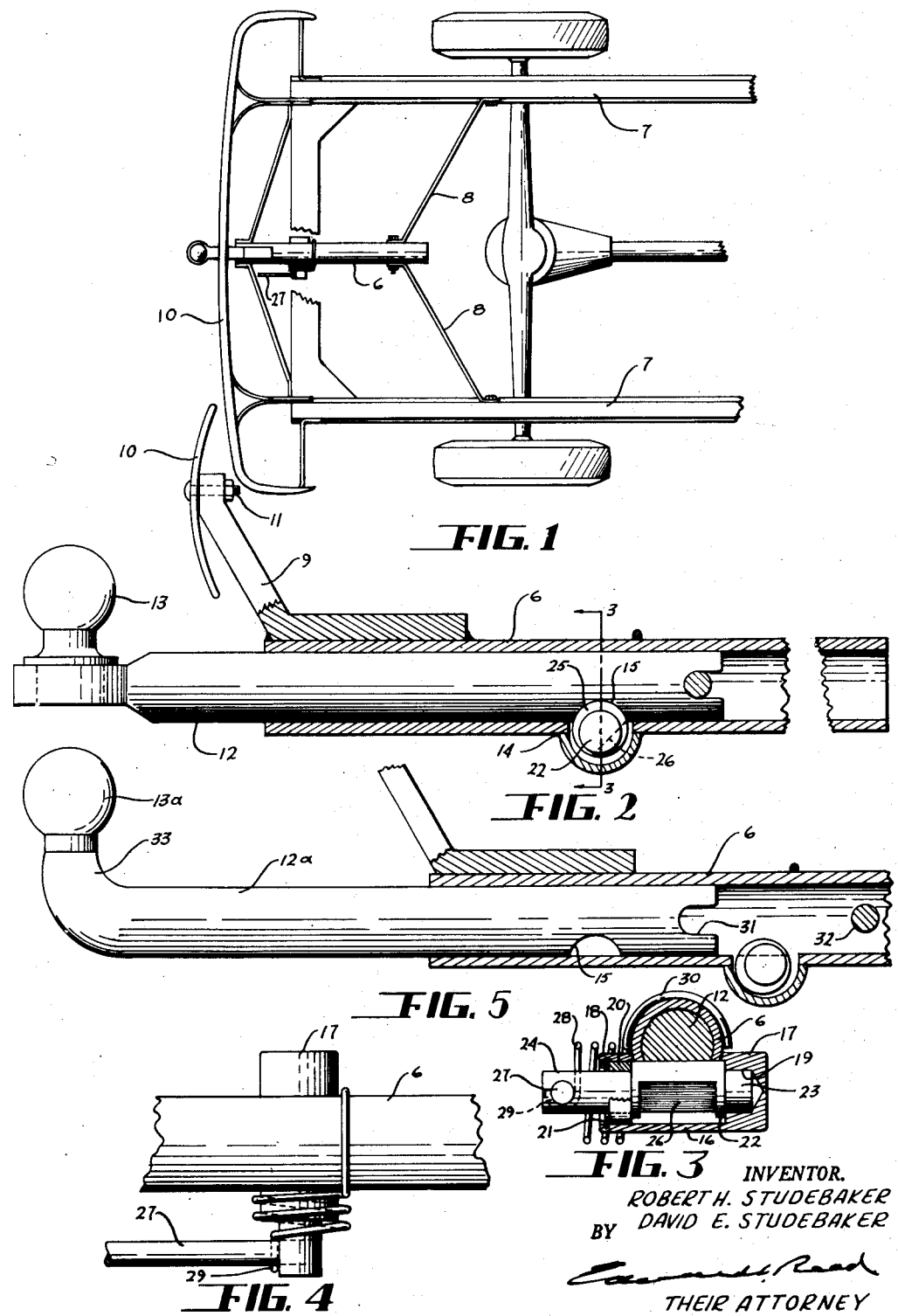

2,639,160

UNITED STATES PATENT OFFICE 2,639,160

TRAILER HITCH

Robert H. Studebaker, Dayton, and David Emmert Studebaker, Tipp City, Ohio

Application January 23, 1950, Serial No. 140,012

4 Claims. (Cl. 280—33.44)

This invention relates to a trailer hitch of the general type commonly employed for detachably connecting a trailer with an automobile.

One object of the invention is to provide a trailer hitch of such character that when not in use it may be substantially concealed and will not project from the automobile in an objectionable manner.

A further object of the invention is to provide a trailer hitch comprising a part to be permanently attached to an automobile, in a substantially concealed position, and a second part detachably connected with the first mentioned part.

A further object of the invention is to provide such a trailer hitch in which the parts may be quickly and easily connected and disconnected and are of a strong durable character.

A further object of the invention is to provide simple but strong means for detachably connecting said parts one with the other.

A further object of the invention is to provide such a trailer hitch which is simple in construction and can be produced at a low cost.

Other objects of the invention may appear as the hitch is described in detail.

In the accompanying drawings, Fig. 1 is a plan view of the trailer hitch showing the same mounted on an automobile; Fig. 2 is a longitudinal sectional view taken centrally through the hitch; Fig. 3 is a transverse section taken on the line 3—3 of Fig. 2; Fig. 4 is a top plan view of a portion of the hitch; and Fig. 5 is a longitudinal sectional view of the hitch showing the movable member in a modified form.

In these drawings we have illustrated one embodiment of the invention and have shown the same as applied to a passenger automobile, but it is to be understood that the hitch as a whole, as well as the several parts thereof, may take various forms and may be applied to automotive vehicles of various kinds without departing from the spirit of the invention.

The hitch comprises a supporting and housing member adapted to be mounted on an automobile, below the body thereof, in a fixed position in which it is concealed, or substantially concealed, from view, a second member movably supported on the supporting member. The major portion of the second member is concealed in the housing and extends rearwardly beyond the same and has at its rear end one element of a coupling. Releasable means secures the movable member to the supporting member. In the form here shown the supporting and housing member 6 is of cylindrical tubular form, of substantial length and is rigidly mounted on the rear portion of an automobile beneath the body thereof and extending lengthwise of the automobile. The supporting member may be secured to the automobile in any suitable manner. In the present instance, the forward end portion of the supporting member is rigidly secured to the side frame members 7 of the automobile, as by bars 8 each secured at one end to the supporting member and at its other end to the adjacent frame member 7. Means are also provided for supporting the rear portion of the supporting member, but inasmuch as the thrust on the supporting member is taken by the connecting bars 8, the rear connection need not be particularly strong and as hereshown, an arm 9 is rigidly secured to the rear portion of the supporting member and extends upwardly and rearwardly therefrom and is rigidly secured to the bumper 10, as by a bolt 11. The arrangement is such that the rear end of the supporting member is located adjacent the rear end of the automobile but forwardly from and slightly below the lower edge of the bumper and is substantially concealed from view.

In this form of the hitch the movable member 12 comprises a cylindrical bar of substantial length, but preferably of a length less than the length of the tubular supporting member. It is supported in the supporting member for longitudinal movement and when in operative position therein extends rearwardly beyond the supporting member and beyond the bumper 10 of the automobile, and is provided at its rear end with a coupling element 13 to cooperate with a complementary coupling element on the trailer. When the trailer is not to be connected with the automobile the movable member may be removed from the supporting member and stored in the trailer, or elsewhere, until it is again desired to connect the trailer with the automobile. When the bar 12 has been so removed those parts of the hitch remaining on the automobile are not readily visible.

The movable member 12 may be secured in its operative position in the supporting member in any suitable manner. Preferably the two members are provided with cooperating locking parts, the locking part on the supporting member being movable into and out of locking relation with the locking part of the movable member. In the construction here illustrated the lower portion of the tubular supporting member is provided with a transverse slot 14 and the lower portion of the movable member is provided with a transverse substantially semi-cylindrical locking recess 15 which is arcuate in cross section and is positioned above the slot when the movable member is in operative position. The supporting member is provided with bearings at each end of the slot 14 and rotatably mounted in these bearings is a locking member having a part which is movable into and out of the locking recess 15 in the movable member by the rotary movement of the locking member. In the form shown a substantially cylindrical housing 16 is rigidly secured to the supporting member and has its upper portion cut away to permit the end portions 17 and 18 of the housing to be secured to the supporting member at the respective ends of the slot 14, a substantially semi-cylindrical portion of the housing extending across the slot. The end portion 17 of the housing is provided with a bearing recess 19 and the end portion 18 is tubular to receive a bearing 20 which is removably mounted therein and retained therein by a split ring 21. The locking member 22 is provided at one end with a pintle 23 which is rotatably supported in the bearing recess 19 and is provided at its other end with a shank 24 which extends through the bearing 20 and beyond the adjacent end of the housing. The intermediate portion of the locking member is provided with a part which is movable into and out of the recess 15 in the movable member 12, this part being preferably in the nature of an eccentric portion 25 of the locking member. Another part of the intermediate portion of the locking member is cut away, as indicated at 26, to provide a short radial portion which is so positioned with relation to the axis of the locking member that it will be moved into the slot 14 when the eccentric portion 25 of the locking member has been moved out of the recess 15 and will thus permit the longitudinal movement of the movable member 12. Preferably the eccentric portion of the locking member corresponds substantially in size and shape to the recess 15 so that when it extends into that recess the movable member 12 is positively locked against longitudinal movement.

Any suitable means may be provided to impart rotary movement to the locking member and in the present instance, the shank 24 thereof is provided with a handle 27 by which it may be rotated. Likewise, any suitable means may be provided for securing the locking member in locking position. Preferably spring means is provided for moving the eccentric portion of the locking member into locking position and for retaining the same in that position. In the form here shown, a single spring 28 is coiled about the shank 24 and the adjacent end of the housing 16. One end of that spring is secured to the shank as by looping the end portion 29 thereof about the handle. The other end portion of the spring 30 is bent to hook shape and extends about the upper portion of the tubular supporting member and is thus held against movement. The arrangement of the spring is such that it is always under tension and when unrestrained will move the locking member to and retain the same in locking position. The locking member may be moved against the action of the spring by pressure on the handle to withdraw the locking part of the locking member from the recess 15, and when that pressure is released the locking member will be immediately restored to locking position.

It is also desirable to provide means for limiting the forward movement of the supporting member and properly positioning the recess 15 of the movable member with relation to the locking member. For this purpose the forward end of the movable member 12 is provided with a forwardly facing transverse recess 31 which, when the movable member is moved to locking position, will engage and embrace a member rigidly mounted in the forward portion of the supporting member, such as a pin 32 which extends through the tubular member in such a position that when the movable member has been moved into embracing engagement therewith the recess 15 will be directly above the slot 14 in the supporting member. Inasmuch as the transverse slot 31 must embrace the pin 32 before the movable member can be moved to locking position, the movable member must be rotatably adjusted to bring the slot 31 into parallelism with the pin 32 before it can be locked, and this adjustment moves the recess 15 into finger position with relation to the locking member.

In Fig. 2 the movable member 12 is provided with a flat rear end portion to which the coupling element 13 is rigidly secured but if desired the coupling element may be formed integral with the movable member. In Fig. 5 the rear end portion of the movable member 12a is turned upwardly at 33 and the coupling element 13a is formed integral therewith. The movable member 12a is substantially L-shaped with the shorter leg terminating in the ball portion 13a functioning as a coupling element.

While we have shown and described one embodiment of our invention, we wish it to be understood that we do not desire to be limited to the details thereof, as various modifications may occur to a person skilled in the art.

Having now fully shown and described my invention, what we claim as new and desire to secure by Letters Patent is:

1. A trailer hitch comprising a tubular supporting member adapted to be mounted on an automobile beneath the body thereof, an elongate cylindrical member removably mounted in said tubular member, said tubular supporting member forming a housing enclosing most of said elongate cylindrical member, a substantially ball-shaped coupling element supported on one end of the elongate members, said elongate member also having in one side thereof a semi-cylindrical locking recess, said tubular member having a transversely disposed slot in one side thereof, a housing member having cylindrical end portions and a substantially semi-cylindrical center portion straddling said slot, said housing extending transversely to the tubular member and permanently secured thereto, and a locking device rotatably mounted in said housing and having an arcuate part movable into and out of said recess by the rotary movement of said device, said locking device including an eccentric cam-like portion seated in the recess when in locking position.

2. A trailer hitch comprising a tubular supporting member adapted to be mounted on an automobile beneath the body thereof, an elongate substantially L-shaped member having the longer leg thereof removably mounted in said tubular member, the shorter leg of the L-shaped member extending rearwardly beyond the tubular member, the shorter leg terminating in a ball-shaped coupling element, said longer leg having in one side thereof a substantially semi-cylindrical locking recess, said tubular member having in one side thereof a transverse slot with which said recess may register, a housing having cylindrical end portions and a substantially semi-cylindrical intermediate portion straddling said slot, said housing being secured to said tubular member, the longitudinal axis of the housing extending transversely to the tubular member, a locking member rotatably mounted in said housing and having an eccentric part movable into and out of the recess in said elongate member, and means for rotating said locking member.

3. A trailer hitch comprising a tubular supporting member adapted to be mounted on an automobile beneath the body thereof, an elongate substantially L-shaped member having the longer leg removably mounted in said tubular member, the shorter leg extending rearwardly beyond the tubular supporting member functioning as a housing, the shorter leg terminating in a substantially ball-shaped coupling element, the longer leg of said L-shaped member having in one side thereof a substantially semi-cylindrical locking recess, said tubular member having in one side thereof a transverse slot with which said recess may register, a housing having substantially cylindrical end portions and a semi-cylindrical center portion secured to said tubular member and extending across said slot, said housing extending in a direction transverse to the tubular member, and a locking member rotatably mounted in said housing and having an eccentric part movable into and out of the recess in said elongate member, means for rotating said locking member, a spring connected to the housing and connected with said locking member to move said member to locking position and means connected with said locking member to move the same against the action of said spring.

4. A trailer hitch comprising a tubular member adapted to be rigidly mounted on an automobile beneath the body thereof and having a cylindrical cavity extending lengthwise of said automobile, said tubular member having an opening in one side thereof, a second member removably mounted in said tubular member, said second member extending beyond the rear end of the tubular member and having a coupling element secured thereto and extending transversely to said tubular member, the major portion of the second member being concealed by the tubular member, said second member having a substantially semi-cylindrical locking recess in one side thereof, a housing member having a longitudinal cavity therein, the center portion of the housing member having a substantially semi-cylindrical cross sectional area, said housing straddling the opening in the side of the tubular member, the longitudinal cavity extending in a direction transverse to the tubular member, a locking member including an arcuate eccentric mounted in the cavity of said housing member for rotary movement for actuating the eccentric into and out of locking engagement with said removable member, spring means for moving said locking member to locking position, and manually operable means for moving said locking member to releasing position.

ROBERT H. STUDEBAKER.
DAVID EMMERT STUDEBAKER.

References Cited in the file of this patent

UNITED STATES PATENTS

| Number | Name | Date |
|---|---|---|
| 1,475,257 | Bottone | Nov. 27, 1923 |
| 2,208,796 | Jaenichen et al. | July 23, 1940 |
| 2,309,249 | Karp | Jan. 26, 1943 |
| 2,309,850 | Klawitter | Feb. 2, 1943 |
| 2,425,838 | Schultz | Aug. 19, 1947 |
| 2,484,751 | Schultz | Oct. 11, 1949 |
| 2,569,086 | Zenk | Sept. 25, 1951 |